United States Patent
Bose et al.

[11] Patent Number: 5,811,957
[45] Date of Patent: Sep. 22, 1998

[54] SPEED SENSORLESS HYBRID VECTOR CONTROLLED INDUCTION MOTOR WITH ZERO SPEED OPERATION

[75] Inventors: Bimal Kumar Bose, Knoxville, Tenn.; Marcelo Godoy Simoes, S. Paulo, Brazil; David Ross Crecelius, Indianapolis, Ind.; Kaushik Rajashekara, Carmel, Ind.; Ronald Allen Martin, Pendleton, Ind.

[73] Assignee: General Motors Corporation, Detroit, Mich.

[21] Appl. No.: 576,878

[22] Filed: Dec. 21, 1995

[51] Int. Cl.[6] ........................................... H02P 3/18
[52] U.S. Cl. ..................... 318/802; 318/808; 318/812
[58] Field of Search ............................. 318/798–812, 318/254, 439, 138

[56] References Cited

U.S. PATENT DOCUMENTS

| | | | |
|---|---|---|---|
| 4,642,546 | 2/1987 | Schönherr | 318/798 |
| 4,713,745 | 12/1987 | Schauder | 318/809 X |
| 4,724,373 | 2/1988 | Lipo | 318/805 |
| 4,814,677 | 3/1989 | Plunkett | 318/254 |
| 4,920,306 | 4/1990 | Mard et al. | 318/800 X |
| 5,097,193 | 3/1992 | Neis et al. | 318/800 |
| 5,272,429 | 12/1993 | Lipo et al. | 318/808 |
| 5,463,301 | 10/1995 | Kim | 318/801 |
| 5,585,709 | 12/1996 | Jansen et al. | 318/807 |
| 5,598,081 | 1/1997 | Okamura et al. | 318/801 |

*Primary Examiner*—Brian Sircus
*Attorney, Agent, or Firm*—Robert M. Sigler

[57] ABSTRACT

A speed sensorless hybrid vector control starts from zero speed by using indirect vector control with stator frequency equal to slip frequency. As soon as the rotor begins to rotate, the drive is converted to direct vector control for normal operation. The direct vector control uses several low pass filters. The first is a harmonic reducing filter for the sensed motor phase current and voltage signals. The others comprise integration apparatus used in the calculation of motor flux quantities from the motor phase current and voltage signals. One of these other filters has a phase lag which is variable in response to stator frequency to compensate for phase lag introduced by the harmonic reducing filter; and the apparatus is thus able to produce a phase compensated set of unit vectors for vector rotation of the commanded stator voltage components from the synchronous to the stationary reference frame as well as a set of non-phase compensated unit vectors for inverse vector rotation of the estimated stator current components from the stationary to the synchronous reference frame. This allows the motor to operate at any point in the torque speed range, down to zero speed if a braking load torque is applied against a smaller input commanded torque, with the resulting torque current flow allowing the drive to remain in direct vector control.

19 Claims, 10 Drawing Sheets

SPEED SENSORLESS HYBRID VECTOR CONTROLLED INDUCTION MOTOR WITH ZERO SPEED OPERATION

BACKGROUND OF THE INVENTION

The technical field of this invention is induction motor controls. In recent years the advent of modern power electronics has substantially changed the motor and controller hardware used in traction control or electric vehicle applications. DC motors have been very popular in such applications in the past because of their characteristic high torque at zero speed and because the decoupled field and armature currents allow independent control of either the field flux or the output motor torque and provide fast response. However, DC motors have the disadvantages of lower machine efficiencies and the high maintenance that accompanies the use of brushes.

The disadvantages of DC motors can be eliminated by the use of an AC induction motor with an IGBT inverter. AC induction motors are robust since they use no brushes or commutators and are capable of four quadrant operation using a variable frequency variable voltage drive control. The use of vector control techniques allows the flux producing component and torque producing component of motor current to be decoupled to produce a motor response like that of a DC motor. Vector control methods of motor control are computation intensive and, when first developed, were not practical due to the lack of capability in the digital processing equipment of the time to handle the high rate of calculations required. However, with the rapid advancement of smaller and faster computers in the last decade, vector control methods have become practical for controlling an induction motor.

Vector control for induction motors is generally classified as indirect vector control (IVC) or direct vector control (DVC). For high performance industrial motor control and electric vehicle applications, indirect vector control using a rotor shaft speed encoder is becoming very popular. With indirect vector control, an induction motor can be operated at any point in the torque-speed plane, from zero speed to the field-weakening region. However, the motor parameters may vary, which causes flux-torque coupling problems and degrades control. In addition, this method requires a speed sensor on the motor shaft and feed-forward slip frequency signals for the required generation of unit vectors. The speed sensor is undesirable because it is expensive and can be unreliable.

Direct vector control generates the unit vectors from flux coils or from the motor terminal voltages and currents, and no speed sensor is required. Direct vector control with stator flux orientation can reduce the problems caused by varying motor parameters; but it has been difficult to operate the motor near zero speed, and self starting of the motor is impossible. The lower speed range in direct vector control has recently been extended by using stator flux orientation and an observer method of flux computation. The motor could be started by a volts/hertz scalar control and then converted into direct vector control; but this start-up method provides inferior performance.

SUMMARY OF THE INVENTION

The invention is a speed sensorless hybrid vector control that overcomes the inherent problems of using only the direct vector control method. The motor starts from zero speed by using indirect vector control and then is converted to direct vector control with some developed torque near zero speed. No speed encoder is needed because, at zero speed, the electrical frequency of the stator is equal to the slip frequency $\phi_{s1}$ and indirect vector operation is valid. As soon as the rotor begins to rotate, the drive is converted to direct vector control for normal operation. The invention further improves the direct vector control by the use of several low pass filters. The first is a harmonic reducing filter for the sensed motor phase current and voltage signals. The others comprise integration apparatus used in the calculation of motor flux quantities from the motor phase current and voltage signals. One of these other filters has a phase lag which is variable in response to stator frequency to compensate for phase lag introduced by the harmonic reducing filter; and the apparatus is thus able to produce a phase compensated set of unit vectors for vector rotation of the commanded stator voltage components from the synchronous to the stationary reference frame as well as a set of non-phase compensated unit vectors for inverse vector rotation of the estimated stator current components from the stationary to the synchronous reference frame. This allows computation of stator flux quantities at very low motor speeds with improved accuracy so that the motor can then operate at any point in the torque speed range. The drive can operate down to zero speed if a braking load torque is applied opposing a smaller input commanded torque, with the resulting torque current flow allowing the drive to remain in direct vector control.

DESCRIPTION OF A PREFERRED EMBODIMENT

Figure 1:
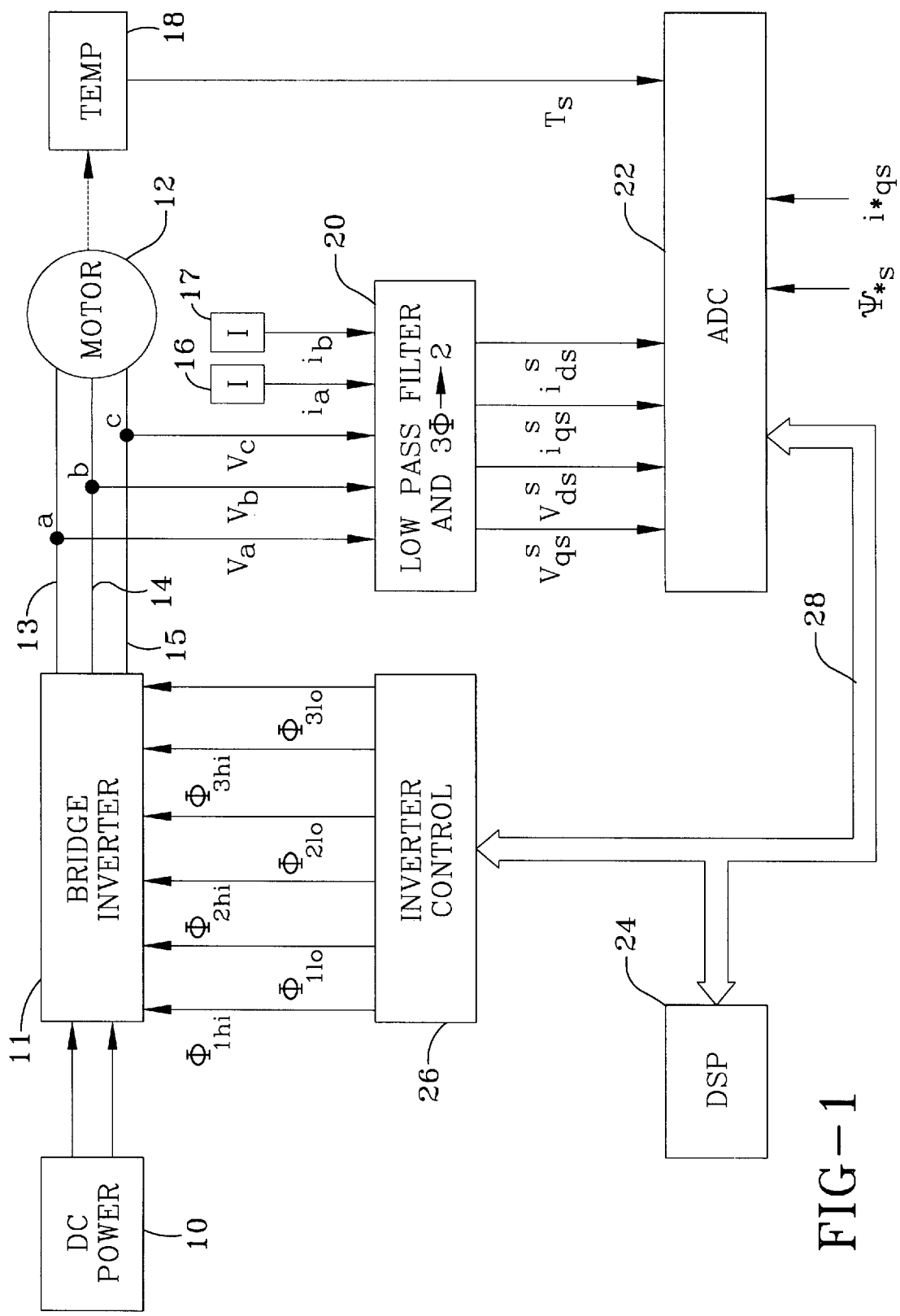
FIG. 1 is a block and schematic diagram of an induction motor system according to the invention.

FIG. 1 shows a motor with a hybrid vector control system according to this invention. A DC power supply 10 feeds a voltage fed, PWM, bridge inverter 11 that generates a variable voltage, variable frequency AC supply for a three phase induction motor 12. DC power supply 10 may be a battery, especially in an electric vehicle application, but may be any other DC supply for industrial and other stationary applications. In a test embodiment, a Toshiba® TOSVERT 130H1 5 horsepower IGBT inverter was used to drive a Reliance® 5 horsepower industrial induction motor, although the volts/hertz control of the inverter was bypassed and only the gate drivers, IGBT's and protection circuits were used.

Motor terminals a, b and c of lines 13, 14 and 15 are connected to provide terminal voltage signals $V_a$, $V_b$ and $V_c$ to a low pass filter and three phase to two phase (3Φ→2Φ) conversion apparatus 20. Likewise, Nana® Hall effect current sensors 16 and 17, responsive to currents in lines 13 and 14, provide phase current signals $i_a$ and $i_b$, respectively, to apparatus 20.

In apparatus 20, the three phase terminal voltage signals $V_a$, $V_b$ and $V_c$ and current signals $i_a$ and $i_b$ are filtered to remove harmonics and converted into the equivalent two phase orthogonal voltage and current vector component quantities in the stationary d-q reference frame $V_{ds}^s$, $V_{qs}^s$, $i_{ds}^s$ and $i_{qs}^s$. Apparatus 20 and its operation will be described in detail with reference to FIGS. 3–6.

A stator temperature signal is required for the form of vector control chosen; and this signal $T_S$ is developed from a stator temperature (TEMP) sensing apparatus 18 comprising a plurality of thermistors at selected points in the stator of motor 12 and an analog processing circuit. Temperature sensing apparatus 18 will be described in more detail with reference to FIG. 7.

Since further operations on the analog output quantities of apparatus 20 will be performed in a digital signal processor (DSP) 24, the quantities $V_{ds}^s$, $V_{qs}^s$, $i_{ds}^s$, $i_{qs}^s$ and $T_S$ are converted to digital format in an analog to digital converter (ADC) 22. Likewise provided to ADC 22 are external control signals $\psi_s^*$ and $i_{qs}^*$, which represent, respectively, the commanded stator flux and the commanded torque current in the synchronous frame.

ADC 22 communicates with DSP 24 and an inverter control 26 via a digital communication bus 28. The input quantities from ADC 22 are processed in DSP 24 to produce commanded synchronous stator voltages $V_{ds}^*$ and $V_{qs}^*$ and a commanded stator flux angle $\theta_e^*$, all of which are output to inverter control 26. From this input, inverter control 26 generates commanded terminal voltages in the form of PWM signals $\phi_{1HI}$, $\phi_{1LO}$, $\phi_{2HI}$, $\phi_{2LO}$, $\phi_{3HI}$, and $\phi_{3LO}$, which are applied to bridge inverter 11.

Figure 2:
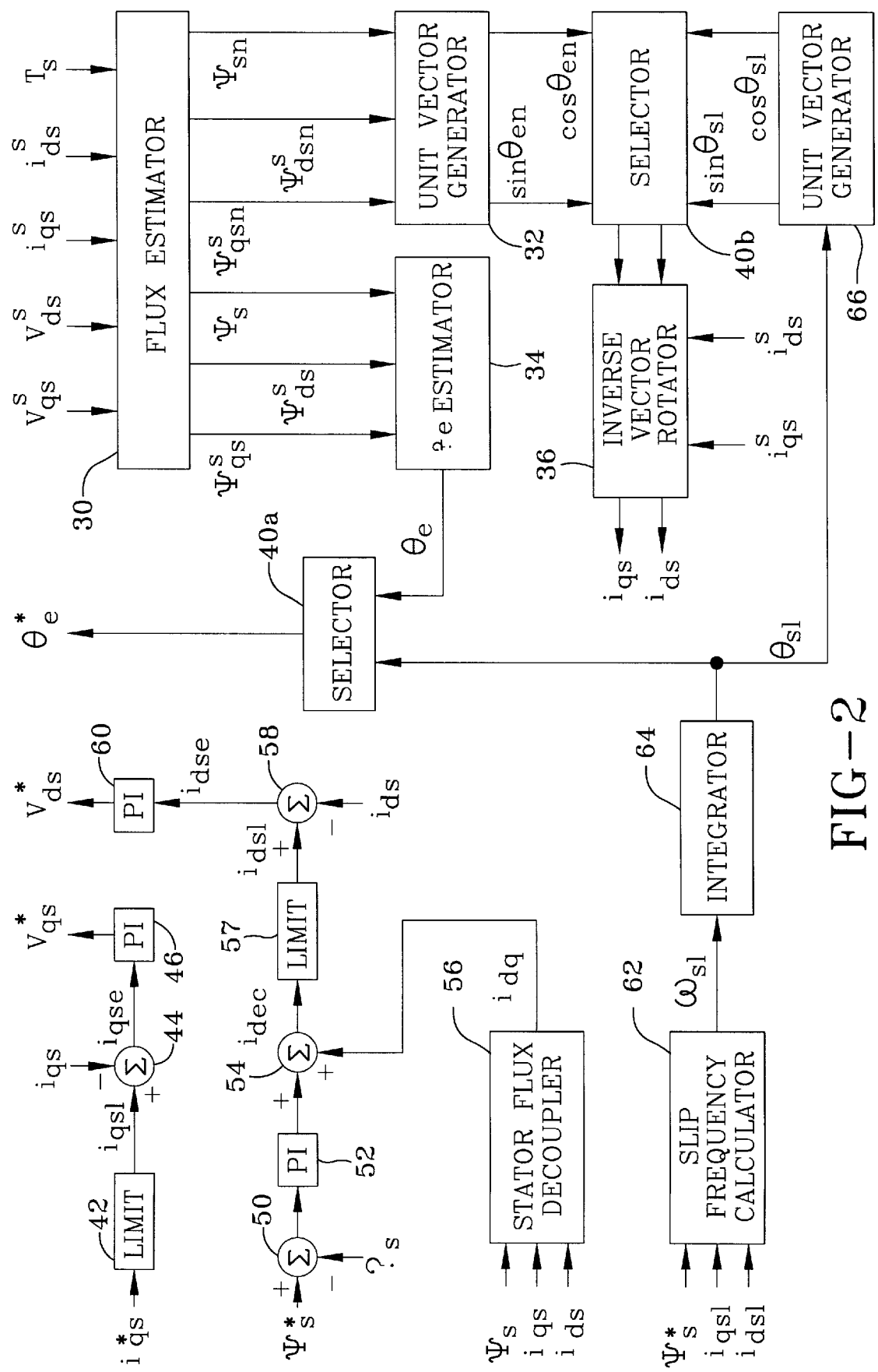
FIG. 2 is a functional block diagram of the DSP block of the induction motor system shown in FIG. 1.

FIG. 2 shows a functional block diagram of the control algorithm performed in DSP 24. The input stationary reference frame d-q voltages and currents $V_{ds}^s$, $V_{qs}^s$, $i_{ds}^s$ and $i_{qs}^s$ and stator temperature $T_S$ are provided to a flux estimator 30, in which they are used to derive phase-compensated orthogonal stator flux components $\Psi_{ds}^s$ and $\Psi_{qs}^s$ in the stationary d-q reference frame and the stator flux magnitude $\Psi_s$, as well as non-phase compensated versions $\Psi_{dsn}^s$, $\Psi_{qsn}^s$ and $\Psi_{sn}$ of the same quantities. The phase compensated values are required because of the phase shift introduced by heavy harmonic filtering of the phase voltages and currents in apparatus 20.

An estimated angle $\theta_e$ of stator flux is then calculated from the phase compensated flux quantities $\Psi_{ds}^s$, $\Psi_{qs}^s$ and $\Psi_s$ in $\theta_e$ estimator 34; and the value of $\theta_e$ is provided to a selector 40a as the angle of stator flux, derived directly from estimated stator flux, for generation of phase compensated unit vectors used in the transformation of commanded voltages $V_{ds}^*$ and $V_{qs}^*$ from the synchronous d-q reference frame to the stationary d-q reference frame in DVC operation. Non-phase compensated unit vector quantities $\sin\theta_{en}$ and $\cos\theta_{en}$ for DVC operation are calculated in unit vector generation apparatus 32 from the non-phase compensated flux quantities $\Psi_{dsn}^s$, $\Psi_{qsn}^s$ and $\Psi_{sn}$ and provided to a selector 40b to be chosen for delivery during DVC operation to an inverse vector rotator 36, which uses them to convert values of $i_{ds}^s$ and $i_{qs}^s$ in the stationary d-q reference frame to values of $i_{ds}$ and $i_{qs}$ in the synchronous d-q reference frame. The reason that two sets of unit vectors, one phase compensated and the other non-phase compensated, are used for DVC operation explained with reference to step 352 of the flow chart of FIG. 9. Selector 40b also receives alternative unit vector quantities $\sin\theta_{s1}$ and $\cos\theta_{s1}$ from a unit vector generator 66, which quantities it provides to inverse vector rotator 36 during IVC operation.

Input signal $i_{qs}^*$ representing commanded torque current in the synchronous frame is limited in limiter 42; and the limited value $i_{qs1}$ is provided to a summing junction 44, in which the estimated torque current $i_{qs}$ from inverse vector rotator 36 is subtracted. The difference is a current error signal $i_{qse}$ provided to a proportional/integral (PI) control 46, the output of which is a commanded synchronous stator voltage $V_{qs}^*$, the value of which is preferably limited.

The estimated phase compensated stator flux $\Psi_S$ from flux estimator 30 is subtracted from the commanded flux $\Psi_S^*$ in summing junction 50, the output of which is provided to a PI controller 52. The output of PI controller 52 is summed in summing junction 54 with a decoupler current $i_{dq}$ calculated in stator flux decoupler 56 from the estimated phase compensated stator flux $\Psi_S$ from flux estimator 30 and currents $i_{qs}$ and $i_{ds}$ from inverse vector rotator 36. The output $i_{dec}$ of summing junction 54 is limited at 57 to form $i_{ds1}$, which is provided to another summing junction 58, in which current $i_{ds}$ from inverse vector rotator 36 is subtracted to produce a current error signal $i_{dse}$. This signal is provided to a PI controller 60, which provides an output commanded synchronous stator voltage $V_{ds}^*$, the value of which is preferably limited.

Slip frequency $\omega_{s1}$ for IVC operation is calculated in slip frequency calculator 62 from the commanded stator flux $\Psi_s^*$ and the limited stator currents $i_{qs1}$ and $i_{ds1}$. The slip frequency is provided to an integrator 64, which produces a slip angle $\theta_{s1}$. Slip angle $\theta_{s1}$ is provided to selector 40a as the commanded stator flux angle for IVC operation and is further provided to unit vector generator 66, which generates unit vectors $\sin\theta_{s1}$ and $\cos\theta_{s1}$ for use in inverse vector rotator 36 during IVC operation. Selector 40b works in concert with selector 40a to provide a transition between IVC and DVC operation, with the slip angle $\theta_{s1}$ provided as output commanded stator flux angle $\theta_e^*$ and $\sin\theta_{s1}$ and $\cos\theta_{s1}$ provided to inverse vector rotator 36 in IVC operation and the estimated angle of stator flux $\theta_e$ provided as output commanded stator flux angle $\theta_e^*$ and $\sin\theta_e$ and $\cos\theta_e$ provided to inverse vector rotator 36 in DVC operation.

Apparatus 20 is shown in detail in the circuit diagrams of FIGS. 3–6. The function of this apparatus is to filter the terminal voltage and current signals and convert the three phase motor terminal voltage and current signals $V_a$, $V_b$, $V_c$, $i_a$ and $i_b$ to two phase orthogonal voltage and current vector component signals $V_{ds}^s$, $V_{qs}^s$, $i_{ds}^s$ and $i_{qs}^s$ in the stationary d-q reference frame, according to the following equations:

$$V_{qs}^s = \frac{1}{3}(2V_{ac} + V_{cb})$$

$$V_{ds}^s = \frac{1}{\sqrt{3}}(V_{cb})$$

$$i_{qs}^s = i_a$$

$$i_{ds}^s = -\left(\frac{2}{\sqrt{3}}i_b + \frac{1}{\sqrt{3}}i_a\right)$$

Since the harmonics in the phase voltages are particularly rich, a two stage filtering process is used for the voltages, with the first low pass filter comprising a passive filter with a cutoff frequency of 2 KHz, while the second low pass filter is an active low pass filter with a cutoff frequency of 80 Hz.

Figure 3:
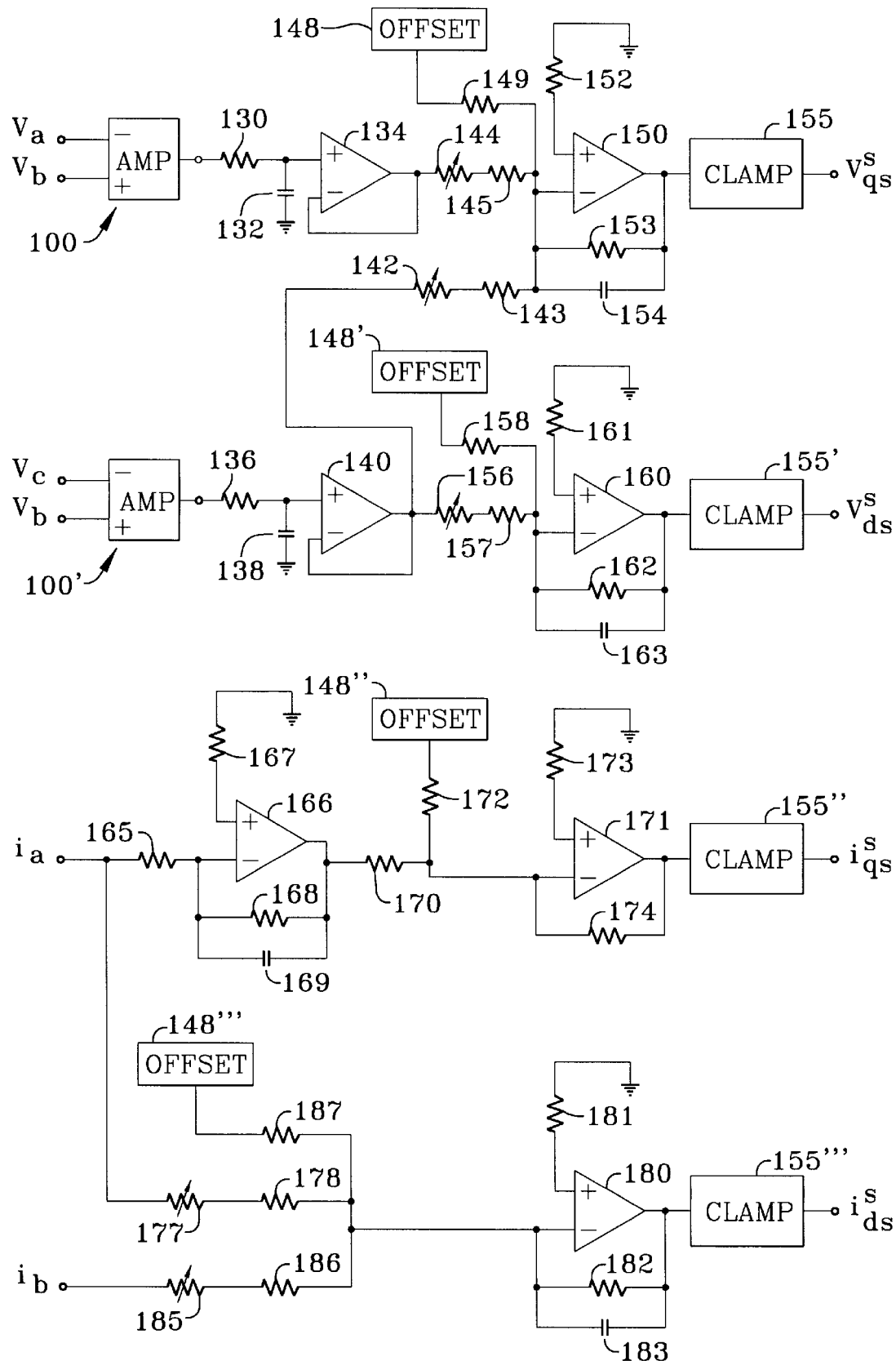
FIG. 3 is a circuit and block diagram of the LOW PASS FILTER AND 3Φ→2Φ apparatus of FIG. 1.

An overall circuit and block diagram of apparatus 20 is shown in FIG. 3. Motor terminal voltages $V_a$ and $V_b$ are provided to the inverting and non-inverting terminals, respectively, of an AMP 100. In an electric vehicle application, the motor terminals are subject to voltages up to several hundred volts; and AMP 100 is thus an isolation amplifier such as an Analog Devices® AD202JN, with external circuitry and connections shown as in FIG. 6. Input terminals 102 and 104 receive voltages $V_a$ and $V_b$, respectively. Resistors 106 and 108 (600K) and resistors 110 and 112 (10K) provide a 60:1 voltage ratio. Capacitors 114 and 116 are 8 nF while capacitors 118 and 120 are 1 $\mu$F. Output terminal 124 is voltage isolated from input terminals 102 and 104 and provides a voltage signal of the difference of Va and Vb, which is the phase voltage $V_{ab}$.

Referring again to FIG. 3, the output of AMP 100 is provided through a passive low pass filter, comprising series resistor 130 (3K) and capacitor 132 (32 nF) to ground, to a buffer amplifier 134. Motor terminal voltages $V_c$ and $V_b$ are provided to the inverting and non-inverting inputs, respectively, of AMP 100', which is identical with AMP 100. The output of AMP 100', which indicates phase voltage $V_{cb}$, is provided through a low pass filter, comprising series resistor 136 (3K) and capacitor 138 (32 nF) to ground, to a buffer amplifier 140.

Figure 5:
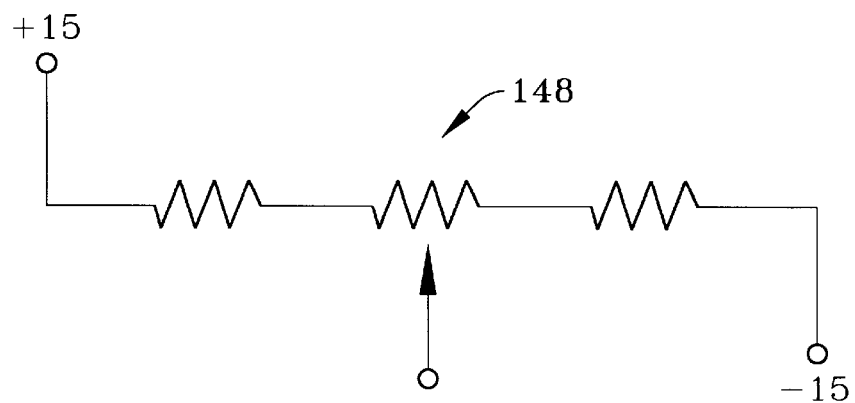
Figure 6:
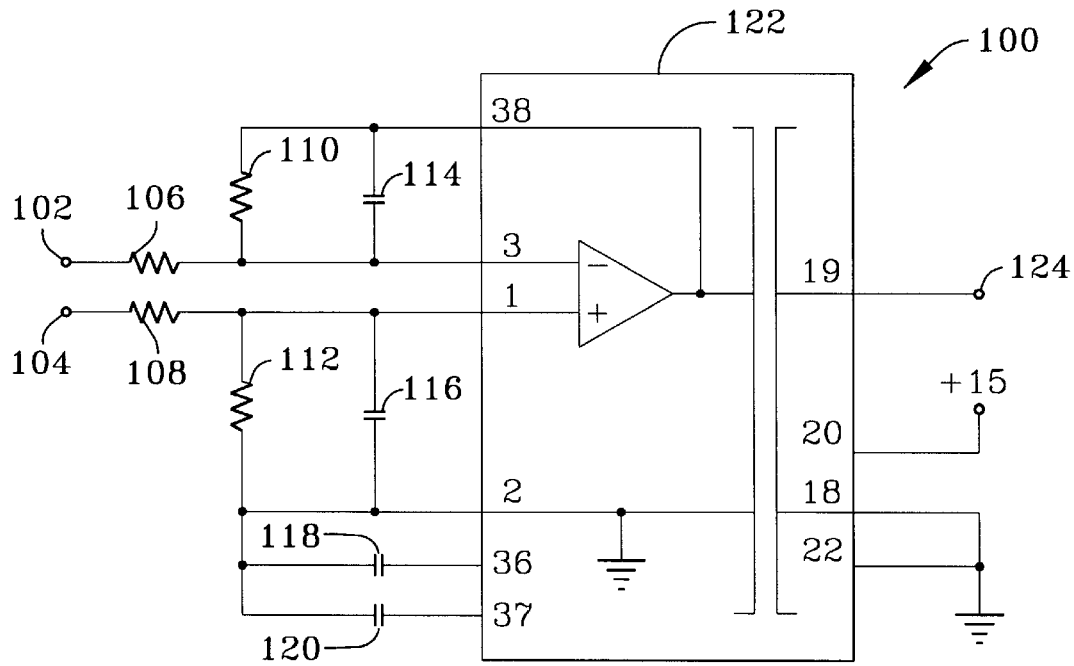

The output of buffer amplifier 140 is provided through scaling resistors 142 (10K pot) and 143 (33.2K) to the inverting input of a filter and scaling amplifier 150. Likewise, the output of buffer amplifier 134 is provided to the same input through scaling resistors 144 (10K pot) and 145 (15K). An adjustable offset voltage is added to the input through a resistor 149 (50K) from an OFFSET voltage generator 148 to zero out any DC component in the signal. As shown in FIG. 5, OFFSET voltage generator 148 comprises a resistive voltage divider comprising series resistors 188 (75K), 189 (5K pot) and 190 (75K) connected between +15 and −15 volts. Adjustment of the potentiometer provides a positive or negative voltage for zero offset. Returning to FIG. 3, amplifier 150 has a non-inverting input connected through a resistor 152 (5K) to ground and a negative feedback loop comprising a resistor 153 (20K) and capacitor 154 (100 nF) in parallel. Its output provides voltage signal $V_{qs}^s$ through a clamping circuit 155, which protects the following ADC apparatus 22.

Figure 4:
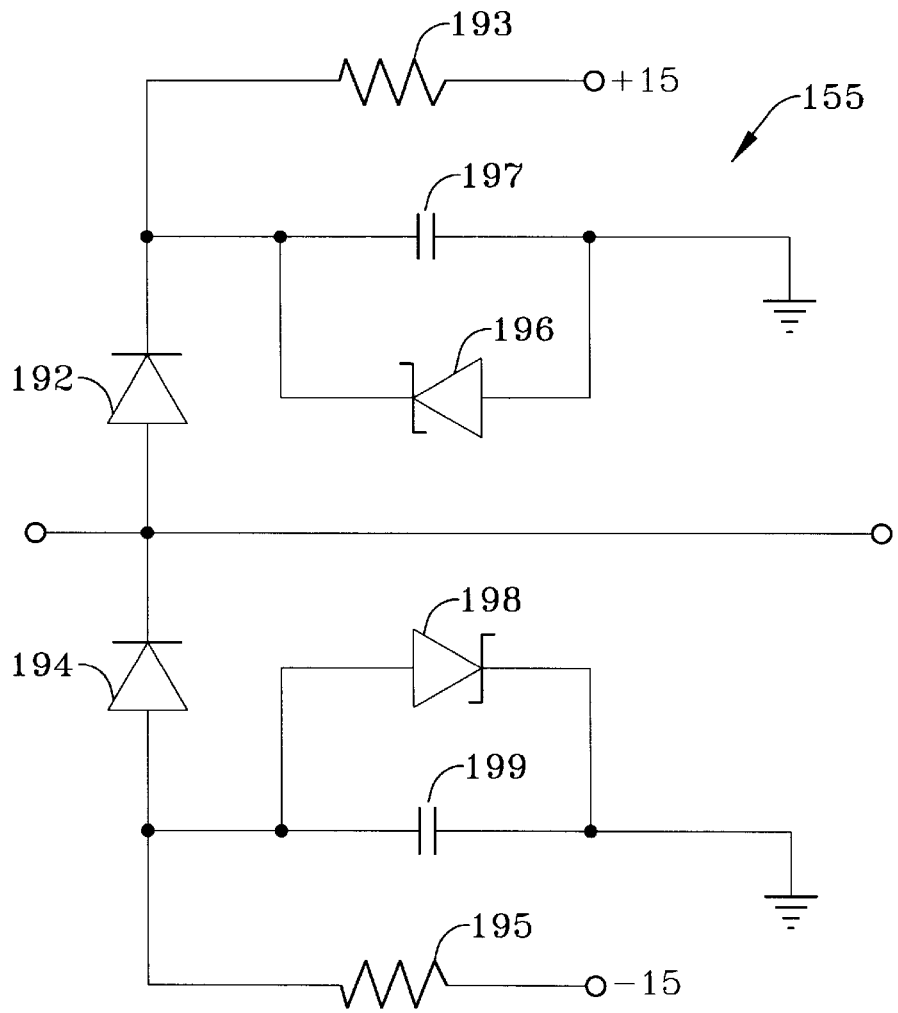
FIGS. 4–6 are circuit diagrams of the CLAMP, OFFSET and AMP blocks shown in FIG. 3.

Clamping circuit 155, shown in FIG. 4, comprises an input/output terminal 191 connected through a diode 192 (1N4001) and resistor 193 (15K) to +15 volts and an inverted diode 194 (1N4001) and resistor 195 (15K) to −15 volts. In addition, the cathode of diode 192 is connected through a zener diode 196 (1N4371A) in parallel with a capacitor 197 (1 $\mu$F) to ground; while the anode of diode 194 is connected through a zener diode 198 (1N4371A) in parallel with a capacitor 199 (1 $\mu$F) to ground. Clamping circuit 155 limits positive and negative voltages to less than ±3.5 volts.

Returning to FIG. 3, the output of buffer amplifier 140 is also provided through scaling resistors 156 (10K pot) and 157 (20K) to the inverting input of filter and scaling amplifier 160, which has a non-inverting input connected through a resistor 161 (7.5K) to ground and a negative feedback loop comprising a resistor 162 (20K) in parallel with a capacitor 163 (100 nF). An adjustable offset voltage is added at the inverting input from an OFFSET voltage generator 148', identical with circuit 148 of FIG. 5, through a resistor 158 (50K). The output of amplifier 160 provides voltage signal $V_{ds}^s$ through a CLAMP circuit 155' identical with circuit 155 of FIG. 4.

Motor terminal current signal $i_a$ from Hall effect sensor 16 is provided through a resistor 165 (48.4K) to the inverting input of an amplifier 166 having a non-inverting input connected through a resistor 167 (6.6K) to ground and a negative feedback loop comprising a resistor 168 (24.2K) in parallel with a capacitor 169 (82 nF). The output of amplifier 166 is connected through a resistor 170 (10K) to the inverting input of a scaling amplifier 171, which also receives an adjustable offset voltage through a resistor 172 (50K) from an OFFSET voltage generator 148" identical with circuit 148 in FIG. 5. Amplifier 171 has a non-inverting input connected through a resistor 173 (5K) to ground and a negative feedback resistor 174 (10K). Its output provides current signal voltage $i_{qs}^s$ through a CLAMP circuit 155" identical with circuit 155 of FIG. 4.

Motor terminal current signal $i_a$ is also provided through series scaling resistors 177 (5K pot) and 178 (83K) to the input of a scaling amplifier 180 having a non-inverting input connected through a resistor 181 (5K) to ground and a negative feedback loop comprising a resistor 182 (24.2K) in parallel with a capacitor 183 (82 nF). The motor terminal current signal $i_b$ is also provided to the inverting input of amplifier 180, through series scaling resistors 185 (5K pot) and 186 (39K). Finally, an adjustable offset voltage is provided to the inverting input of amplifier 180 through a resistor 187 (50K) from an OFFSET voltage generator 148''' having a circuit identical with circuit 148 of FIG. 5; and the output provides current signal voltage $i_{ds}^s$ through a CLAMP circuit 155''' identical with circuit 155 of FIG. 4.

Figure 7:
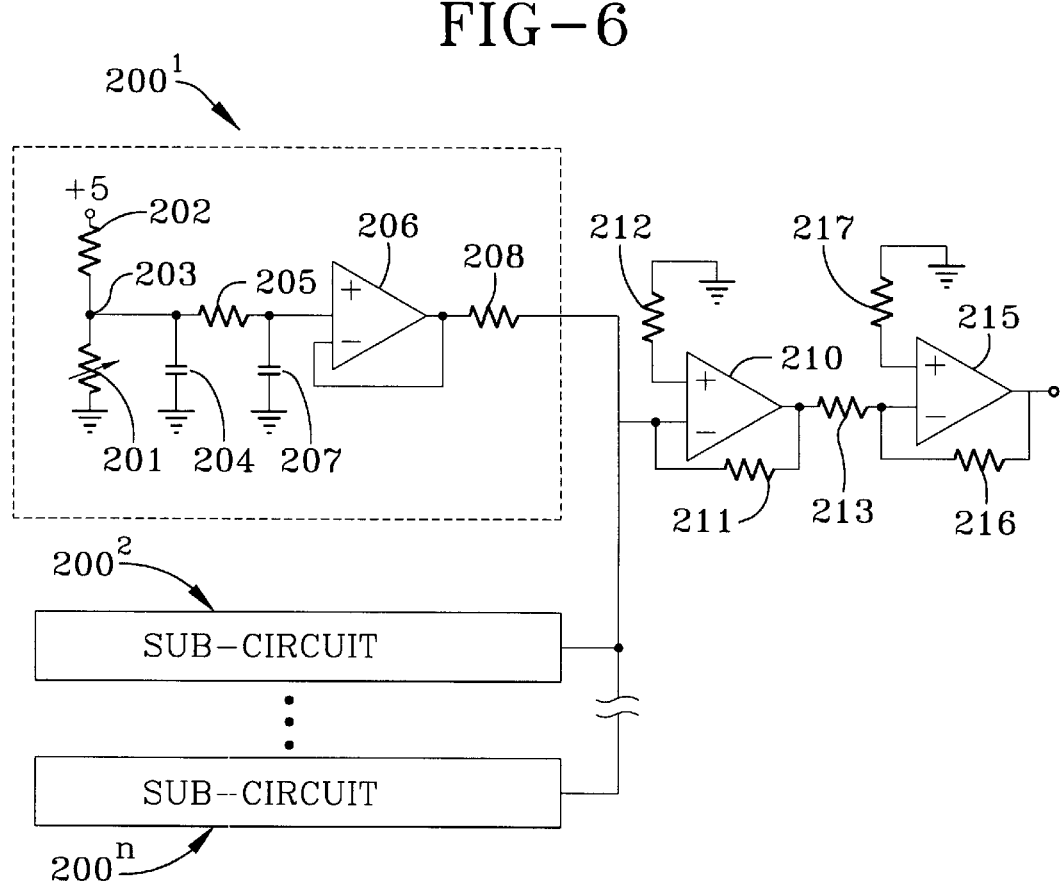
FIG. 7 is a circuit diagram of the TEMP block of FIG. 1.

The stator temperature interface circuit (TEMP) 18 is shown in detail in FIG. 7. A plurality of thermistors are placed so as to sense the temperature at different locations in the stator of motor 12. Each thermistor is incorporated in a sub-circuit; and the outputs of the five sub-circuits are combined to produce an average value. A first thermistor sub-circuit $200^1$ comprises a thermistor 201 connected in series with a resistor 202 (10K) between +5 V and ground. Junction 203 of thermistor 201 and resistor 202 is connected through a capacitor 204 (0.001 $\mu$F) to ground and through a resistor 205 (20K) to the non-inverting input of an op amp 206, which input is also connected through a capacitor 207 (0.1 $\mu$F) to ground. The output of op amp 206 is connected in feedback to its inverting input and to one terminal of a resistor 208 (75K). The other terminal of resistor 208 provides an output for sub-circuit $200^1$.

Similar sub-circuits are provided, such as $200^2 \ldots 200^n$, one for each of the other thermistors. In a preferred embodiment, a total of 5 may be provided. Each sub-circuit provides an output voltage indicative of the temperature measured by its thermistor. These voltages are then added by connecting the outputs of the sub-circuits together at the inverting input of an op amp 210 having a resistor 211 (15K) connected in negative feedback and a resistor 212 (4.1K) connected from its non-inverting input to ground. The output of op amp 210 is connected through a resistor 213 (20K) to the inverting input of an op amp 215 having a resistor 216 connected in negative feedback and a resistor 217 connected from its non-inverting input to ground. The output of op amp 215 is the output of the stator temperature interface circuit and represents the average of the temperatures measured by the thermistors.

In the test embodiment of the motor control, DSP 24 was a Texas Instruments® TMS320C30 digital signal processor integrated with an input/output circuit on a single PC computer board by Spectrum®. The DSP operates at a clock frequency of 33 MHz, which provides for a 60 ns instruction cycle time, with all instructions completing in a single cycle and many executable in parallel. Two 16 bit ADC converters, with a maximum sampling rate of 153 KHz and a 1.5 $\mu$s conversion time, are included on the board: and these were used as part of ADC apparatus 22 for conversion of voltages $V_{qs}^s$ and $V_{ds}^s$, due to the need for high resolution in the conversion of these quantities. The other input variables—$i_{ds}^s$, $i_{qs}^s$ and $T_S$—require less resolution and were converted in a separate Spectrum® 4 channel input/output board having 12 bit ADC converters with a maximum sampling rate of 58 KHz and a 3 µs conversion time. A DSP-LINK™ data bus was used to communicate between DSP 24, ADC apparatus 22 and inverter control 26.

In the test embodiment, inverter control 26 was a Hanning® PBM 1/87 dedicated integrated circuit which provides the functions of vector rotation, 2Φ→3Φ conversion and PWM signal generation; and this relieved DSP 24 of the need to perform the calculations for these functions. The commanded synchronous reference frame quantities $V^*_{ds}$, $V^*_{qs}$ and $\theta^*_e$ were supplied to inverter control 26, which derived phase compensated unit vectors as the sine and cosine of the commanded stator angle $\theta^*_e$ and performed vector rotation to transform the voltage signals $V^*_{ds}$ and $V^*_{qs}$ into the stationary reference frame according to the following equations:

$$V_{qs}^s = V_{qs} \cos\theta^*_e + V_{ds} \sin\theta^*_e$$

$$V_{ds}^s = -V_{qs} \sin\theta^*_e + V_{ds} \cos\theta^*_e$$

Inverter control 26 also transformed the voltages in the d-q reference frame to three phase voltages, generated therefrom the PWM signals $\phi_{1HI}$, $\phi_{1LO}$, $\phi_{2HI}$, $\phi_{2LO}$, $\phi_{3HI}$, and $\phi_{3LO}$ and provided these signals to bridge inverter 11 to generate the sinusoidal phase voltages in motor 12.

The software in DSP 24 is structured into a main program and two interrupt service routines. One of the interrupt service routines (OUTPUT) is triggered every 32 µs by a data request interrupt from the PWM IC in inverter control 26; and this interrupt is used as a basic cycle control for the main program MAIN. MAIN is restarted by OUTPUT on the first of every four data request interrupts and is divided into two portions or tasks, each of which has a different loop time. The first task of MAIN, which contains those calculations which require updating most frequently, runs each time MAIN is restarted (every 128 µs). The second task of the main program, which contains those calculations which do not need such frequent updating, follows the first task only during the first of every eight consecutive times MAIN is restarted (every 1024 µs) and is otherwise skipped.

Figure 8:
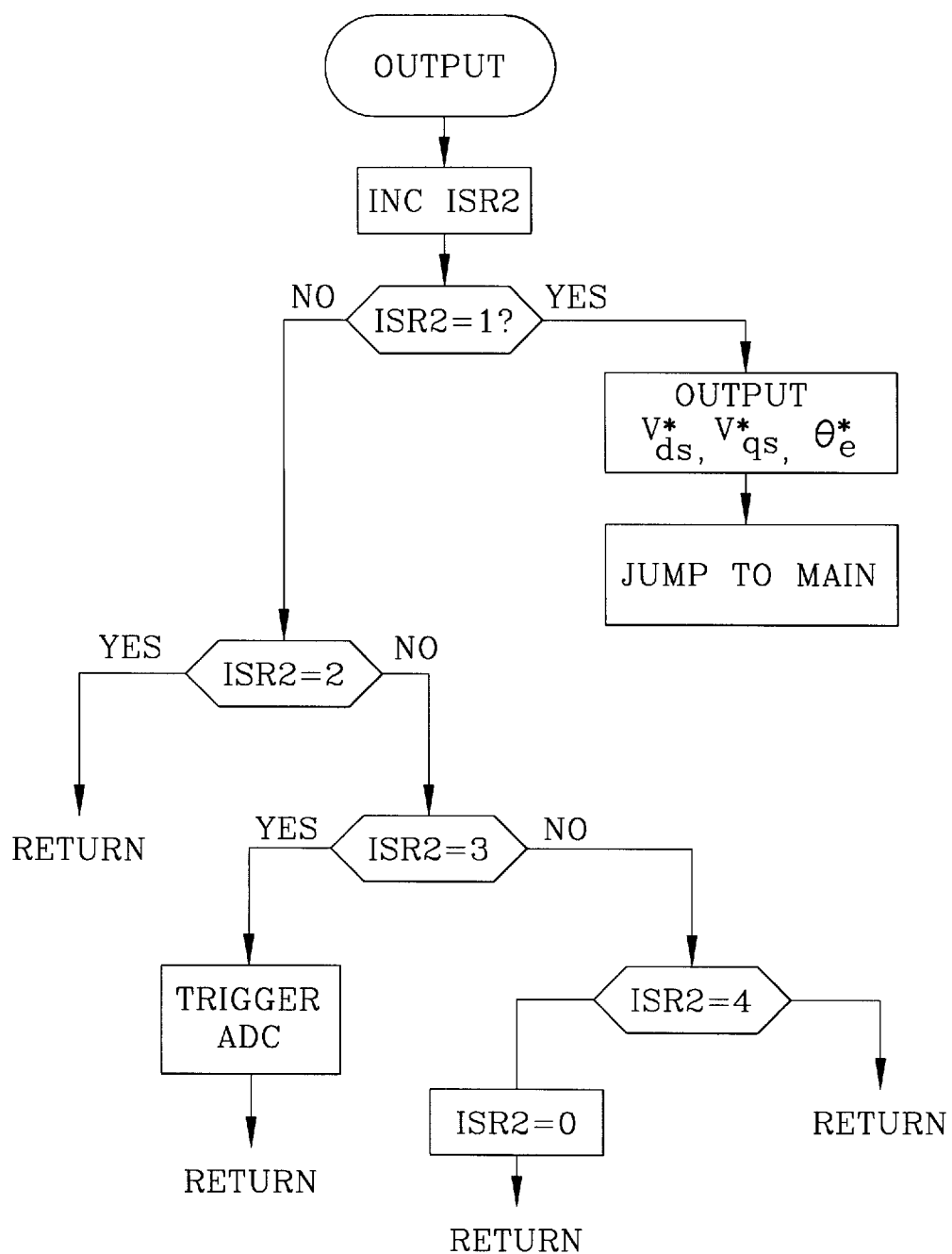
FIGS. 8–12 are flow charts illustrating the operation of the apparatus of FIG. 1.

Interrupt service routine OUTPUT is shown in flow chart form in FIG. 8. Index ISR2 is initialized at zero. At step 300, index ISR2 is incremented. At step 301, if the index is 1, the routine proceeds to write the commanded voltages $V^*_{ds}$, $V^*_{qs}$ and stator flux angle $\theta^*_e$ to inverter control 26 at 302 and then sets up DSP 24 to jump to MAIN at 303, e.g. by pushing the starting address of MAIN onto the stack, before returning from the interrupt. In the second interrupt, index ISR2 will be incremented at step 300 to 2 and the routine will return from step 304. In the third interrupt, index ISR2 will be incremented at step 300 to 3 and the routine will be sent from step 305 to trigger sampling in ADC apparatus 22 at step 306. When ADC apparatus 22 is ready to transmit data, it will generate an interrupt which triggers an interrupt service routine INPUT in DSP 24. INPUT handles the digital data transfer in the normal manner and will therefore not be described in detail. Returning to interrupt service routine OUTPUT, in the fourth interrupt, index ISR2 will be incremented at step 300 to 4 and; and the routine will be sent from step 307 to reset ISR2 to zero at step 308 before returning from the interrupt. Thus, DSP will return from the first of every four consecutive data request interrupts to restart MAIN but otherwise will return to the point (generally in the second task of MAIN) from which it was interrupted. MAIN is set up such that its first task will be completed in less than the 128 µs available before it is restarted and its second task will be completed in less than the 1024 µs available before it is run again.

Figure 9:
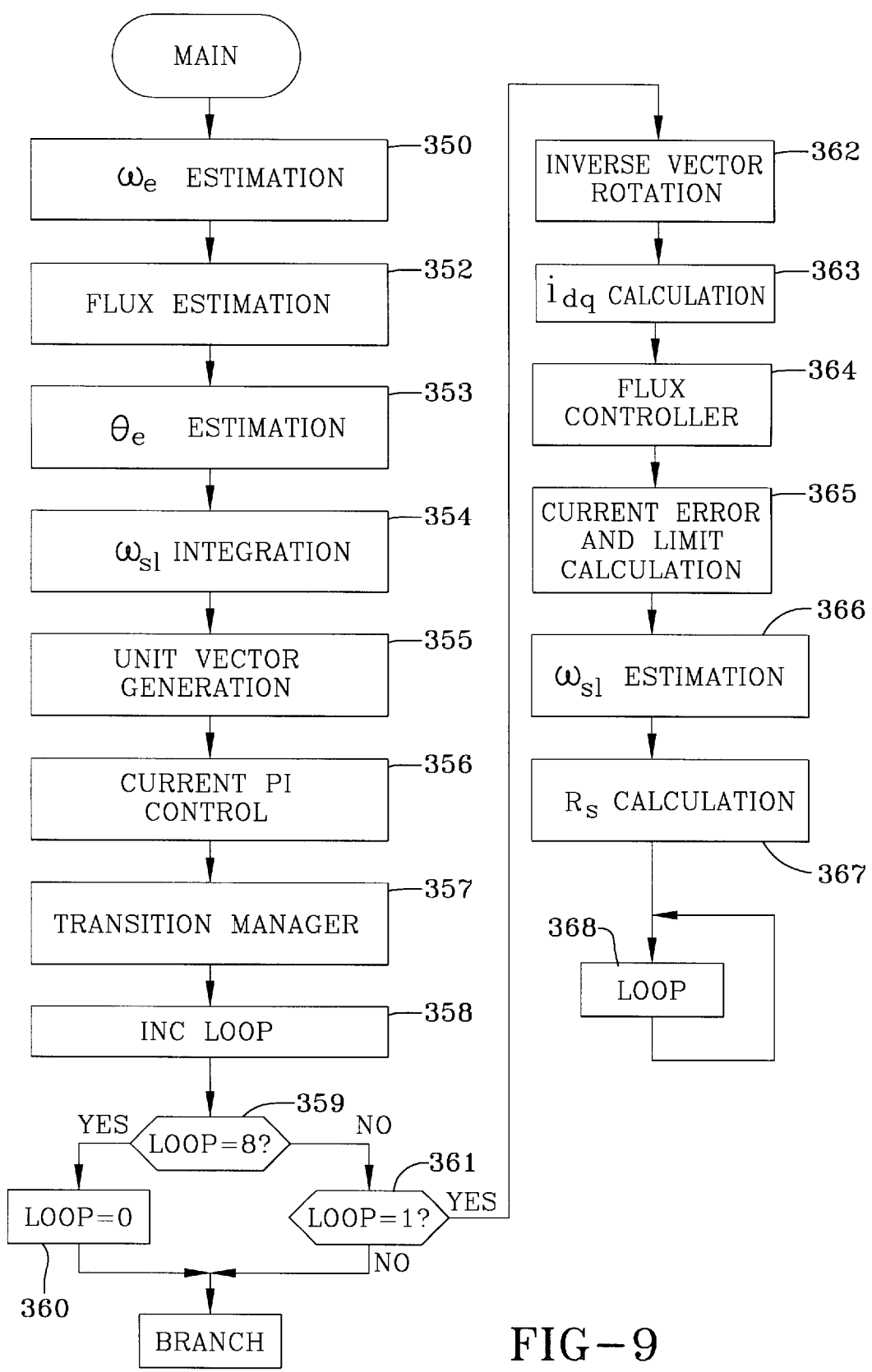

MAIN is described in the flow chart of FIG. 9. Its first task includes the blocks denominated 350–357. First, at step 350, the stator frequency $\omega_e$ is estimated from the input phase voltage and current values in the stationary reference frame and the flux components calculated and stored as described hereinafter, according to the following equation:

$$\omega_e = \frac{(V_{qs}^s - i_{qs}^s R_s)\Psi_{dsn}^s - (V_{ds}^s - i_{ds}^s R_s)\Psi_{qsn}^s}{(\Psi_{qsn}^s)^2 + (\Psi_{dsn}^s)^2}$$

For this equation, non-phase compensated values of the fluxes are used. In addition, the output of the equation is preferably low pass filtered to eliminate noise and limited to prevent negative or overly large values. Of course, a zero denominator is detected and changed to a small positive value to allow division.

Next, at step 352, DSP 24 calculates the orthogonal stator flux components $\Psi_{ds}^s$ and $\Psi_{qs}^s$, which are given by the following equations:

$$\Psi_{ds}^s = \int(V_{ds}^s - i_{ds}^s R_s)dt$$

$$\Psi_{qs}^s = \int(V_{qs}^s - i_{qs}^s R_s)dt$$

$$\Psi_s = \sqrt{(\Psi_{ds}^s)^2 + (\Psi_{qs}^s)^2}$$

The first two of these equations, however, require integration; and two problems arise while trying to perform these integrations. The first is that, if a pure integrator is used, any DC offset in the signal will eventually cause the integrator to saturate or cause significant offset problems in the integrated signal. The analog interface circuit signals of apparatus 20 can be zeroed, but it is difficult to maintain absolutely zero DC offset all the time; and even a few millivolts of offset can cause integration problems. The second is the phase shift introduced by the low pass filters of apparatus 20. This heavy filtering is required to eliminate the rich harmonics in the motor phase voltage and current signals so as to produce very clean signals at low speeds in DVC operation; but this also produces significant phase shift. This phase shift is not a problem for calculation of the unit vectors used for inverse vector rotation of currents $i_{ds}^s$ and $i_{qs}^s$ from the stationary to the synchronous reference frame since, as will be described with reference to step 362, these current values, which are multiplied by the unit vectors in the calculation, have the same phase shift. However, the commanded voltages $V^*_{ds}$ and $V^*_{qs}$ which are vector rotated from the synchronous to the stationary reference frame are DC voltage values which have no angle, and therefore no phase shift. Therefore, phase shift in the unit vectors multiplied by them in the calculations will produce inaccuracy in the output commanded voltages. Therefore, both phase compensated and non-phase compensated unit vectors are required.

The DC offset problem is significantly reduced in this system by using in the first two equations, in place of a pure integrator, a discrete low pass filter with a low cutoff frequency, since any offset introduced will eventually decay to zero. The phase shift is corrected, for the set of unit vectors requiring the correction, by using a low pass filter with a programmable cutoff frequency. It is known that a pure integrator will introduce a phase shift of 90°. If the overall phase lag of the analog low pass filter in apparatus 20 and the discrete low pass filter is programmed to be 90° and the signal magnitude is corrected, the discrete low pass filter will act as an integrator with phase compensation. The stator frequency $\omega_e$ is estimated and used to access a look-up table containing the appropriate discrete low pass filter time constant values to make the overall phase lag equal to 90°.

It has further been determined experimentally and by simulation that if only a single low pass filter is used to perform the integration, at very low frequencies a small DC offset in the input signal would cause a fixed DC offset in the discrete low pass filter output (a capacitor locked condition), due to the need for a large filter time constant value at low frequencies to achieve the desired 90° phase lag. In order to reduce the filter time constant required at low speeds and thereby eliminate the resultant capacitor locked condition at the filter output, the discrete low pass filter is embodied in two cascaded low pass filters.

Figure 10:
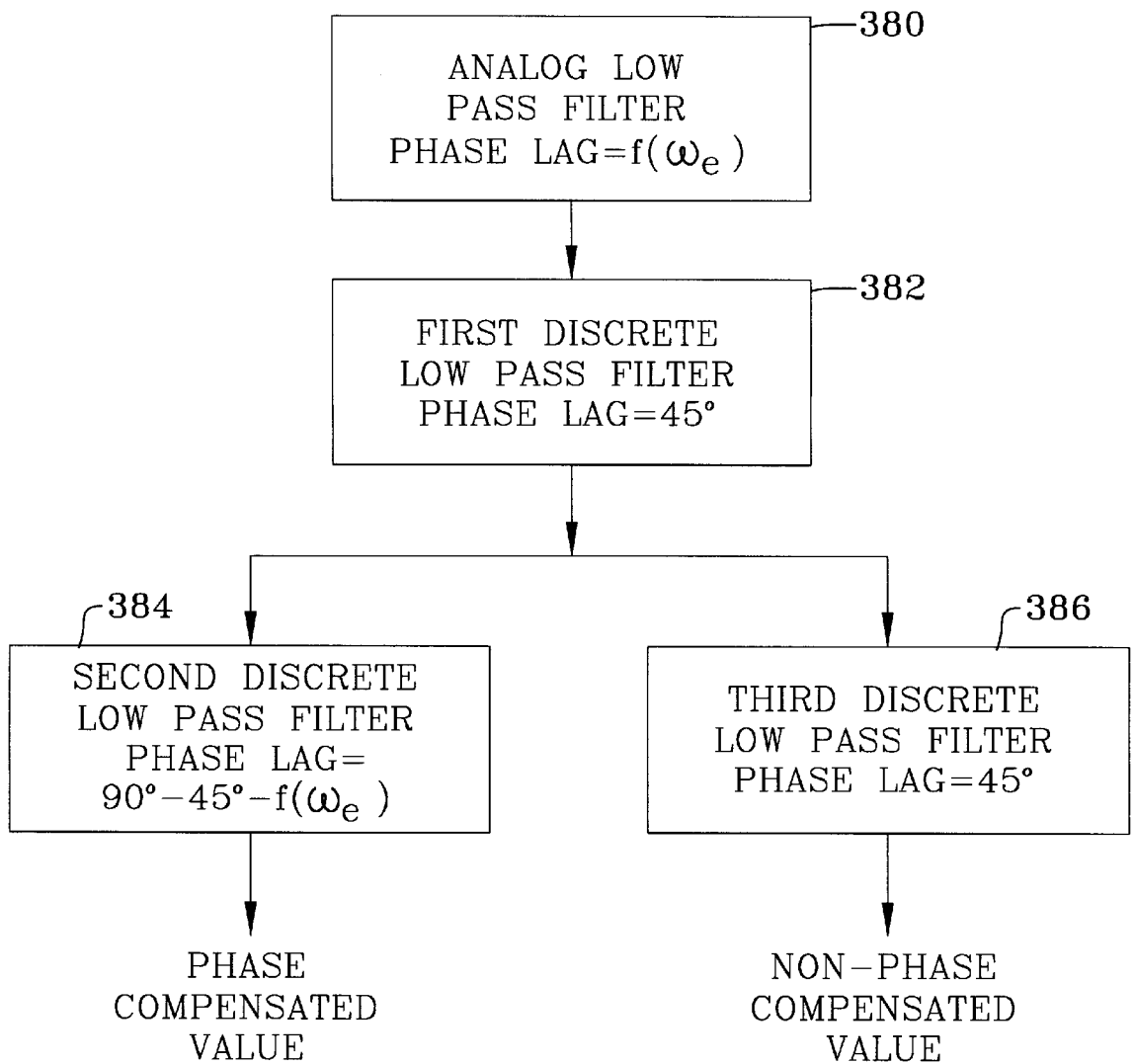

The low pass filter phase compensation arrangement is shown in FIG. 10, in which each block represents a phase lag introduced by a low pass filter. Block 380 indicates the variable phase lag introduced by the analog, harmonic eliminating low pass filters of apparatus 20, which phase lag is a function of stator frequency $\omega_e$. Block 382 is the fixed 45° phase lag of the first discrete low pass filter of step 352 within DSP 24. Block 384 is the phase lag of the second discrete low pass filter of step 352 within DSP 24, which filter processes the output of the first discrete low pass filter and which is programmed to provide a phase lag which, when added to those of blocks 380 and 382, produces a total phase lag of 90° (that is, 90°−45°−f($\omega_e$)). The output of these low pass filters is a value that has been low pass filtered with a low time constant and phase lag to emulate the output of an integrator but has been phase compensated for the phase lag introduced by the harmonic reducing low pass filters of apparatus 20. Block 386 is the 45° phase lag of the third discrete low pass filter of step 352 within DSP 24, which also processes the output of block 382. The sum of the phase lags of blocks 380, 382 and 386 is not necessarily equal to 90°; and the output of the third discrete low pass filter of step 352 thus produces non-phase compensated signals required for inverse vector rotator 36, to be described below.

Each of the discrete low pass filters used in step 352 for integration and phase compensation is of the following form:

$$y(k) = \left(\frac{T_s}{T_c}\right)x(k-1) - \left(\frac{T_s}{T_c} - 1\right)y(k-1)$$

where y(k) is the present value of the output, y(k−1) is the previous value of the output, x(k−1) is the previous value of the input, $T_S$ is the sampling time and $T_c$ is the filter time constant, which is given by $T_c$=tan(PHASELAG)/$\omega_e$, where PHASELAG is the desired phase lag for the filter.

Figure 11:
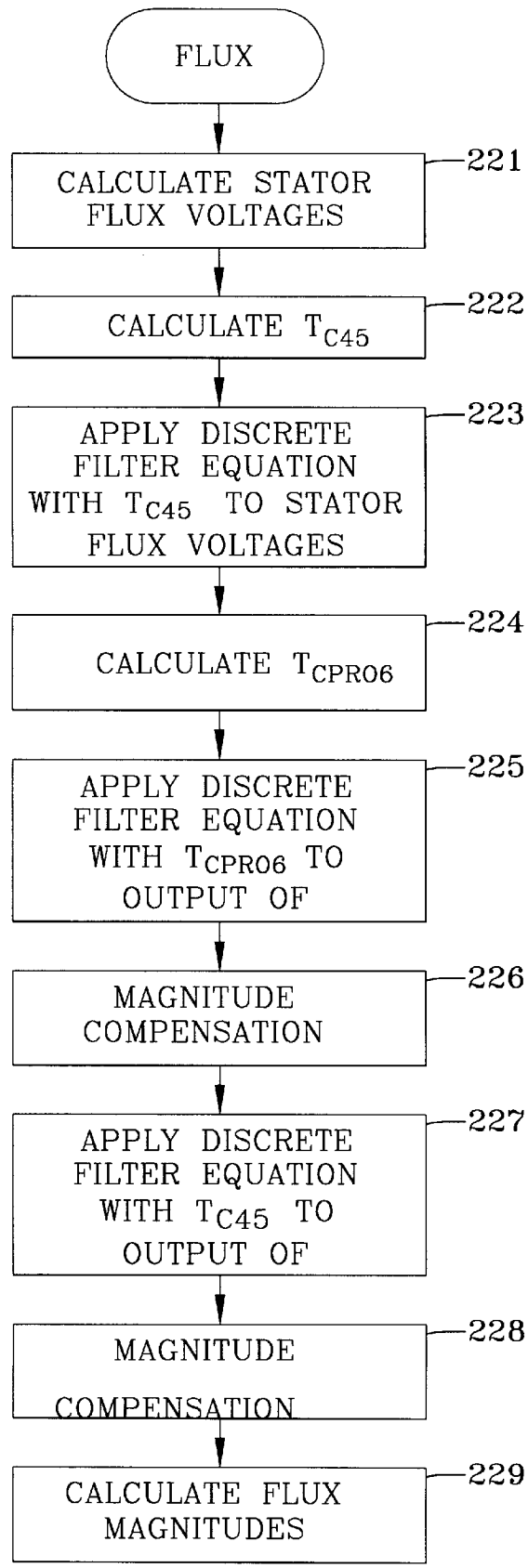

Thus, step 352 calls a subroutine FLUX, a flow chart of which is shown in FIG. 11. At step 221, the stator flux voltages $V_{ds}^s - i_{ds}^s R_s$ and $V_{qs}^s$ 31 $i_{qs}^s R_s$ are calculated. At step 222, the time constant $T_{c45}$ for 45° is derived from the equation $T_{c45}$=tan(45°)/$\omega_e$=1/$\omega_e$, with $\omega_e$ given a lower limit of 5 rad/s. At step 223, the discrete filter equation described above is applied to each of the stator flux voltages calculated at step 221, using time constant $T_{c45}$. This is the first discrete low pass filter referred to in block 382 of FIG. 10. At step 224, the time constant $T_{cprog}$ is derived. For values of $\omega_e$ greater than 15.7, $T_{cprog}$ is derived from a lookup table based on the equation $T_{cprog}$=tan(45°−f($\omega_e$)/$\omega_e$, where (45°−f($\omega_e$)) is the angle which provides a total 90° phase lag as described above. For greater resolution when $\omega_e$ is smaller—e.g. between 5 and 15.7 rad/s–$T_{cprog}$ is derived from an "interpolation" equation $T_{cprog}$=0.22+0.010124$\omega_e$; and, for values of $\omega_e$ less than 5 rad/s, $T_{cprog}$ is given a constant value 0.159. At step 225, the discrete filter equation is applied to each output of step 223 using time constant $T_{cprog}$. This is the second discrete low pass filter referred to in block 384 of FIG. 10. At step 226, each output of step 225 is multiplied by the sum ($T_S+T_{cprog}$) for magnitude compensation to produce the phase compensated stator flux components $\Psi_{ds}^s$ and $\Psi_{qs}^s$. At step 227, the discrete filter equation is applied to each output of step 223 using time constant $T_{c45}$. This is the third discrete low pass filter referred to in block 386 of FIG. 10. At step 228, each output of step 227 is multiplied by the sum ($T_S+T_{c45}$) for magnitude compensation to produce the non-phase compensated stator flux components $\Psi_{dsn}^s$ and $\Psi_{qsn}^s$. Finally, at step 229, the stator flux magnitudes $\Psi_s$ and $\Psi_{sn}$ are each calculated as the square root of the sum of the squares of the corresponding stator flux components.

Returning to the flow chart of FIG. 9, the $\theta_e$ estimation for DVC operation is accomplished at step 353 by first deriving unit vectors $\sin\theta_e=\Psi_{qs}^s/\Psi_s$ and $\cos\theta_e=\Psi_{ds}^s/\Psi_s$ from the phase compensated stator flux components and magnitude. The angle $\theta_e$ itself is then determined by deriving a base angle $\sin^{-1}\theta_e$ from a lookup table, determining the proper quadrant from the signs of $\sin\theta_e$ and $\cos\theta_e$ and adding the appropriate quadrant value of 0, 90, 180 or 270 degrees to the base angle. Angle $\theta_e$ is stored for output to inverter control 26 as the commanded stator flux angle $\theta_e^*$ in DVC operation.

At step 354, slip velocity $\omega_{s1}$, which is calculated and stored in the second task of MAIN, is integrated to produce $\theta_{s1}$. This integration is performed by a discrete integrator equation (k)=y(k−1)+$T_S$x(k), wherein y(k) and y(k−1) are the new and old values, respectively, of the integrated variable, x(k) is the new value of the input integrand and $T_S$ is the sampling time. The calculated slip velocity $\omega_{s1}$ is stored for further use.

The unit vectors required by inverse rotator 36 are then calculated at step 355. The unit vectors for DVC operation are derived from the non-phase compensated values of the stator flux variables $\sin\theta_{en}=\Psi_{qsn}^s/\Psi_{sn}$ and $\cos\theta_{en}=\Psi_{dsn}^s/\Psi_{sn}$ calculated and stored in step 352. The unit vectors for IVC operation are derived from a slip angle $\theta_{s1}$, which is calculated from $\omega_{s1}$ and stored in the second task of MAIN, in a lookup table as $\sin\theta_{s1}$ and $\cos\theta_{s1}$. A single lookup table for sine values can be used for both with $\cos\theta_{s1}=\sin(90°-\theta_{s1})$. The unit vectors $\sin\theta_{en}$ and $\cos\theta_{en}$ are stored for use in the second task of MAIN.

At step 356, the commanded output stator voltages $V_{ds}^*$ and $V_{qs}^*$ are derived from error current signals $i_{qse}$ and $i_{dse}$, calculated and stored in the second task of MAIN, in a proportional/integral (PI) control comprising the following discrete equation:

$$y(k)=K_p x(k)+K_j[y(k-1)+T_S x(k)]$$

wherein y(k) and y(k−1) are the new and previous values of the D or Q component of commanded stator voltage, x(k) is the new value of the error from summing junction 54 or 44, respectively, $T_S$ is the sampling time and $K_p$ and $K_j$ are gain constants for the proportional and integral terms. The equation is evaluated for each component; and the outputs, limited to ensure operation in the pure sinusoidal pulse width modulation (SPWM) region, are stored for output to inverter control 26 as commanded output stator voltages $V_{ds}^*$ and $V_{qs}^*$.

At step 357, the transition manager provides control of transition between IVC and DVC operation. As previously mentioned, direct vector control of AC induction motors does not provide for motor starting, since the stator flux quantities are not yet established. In the control of this invention, therefore, the motor is started in indirect vector control. Since rotor speed is zero at initial startup, the stator frequency is equal to the slip frequency, which may be used as the initial commanded value; and the desired slip frequency calculated from initial values of commanded torque and flux is assumed to be the desired stator frequency. Once the motor is started, the increase in rotor speed makes this assumption increasingly less valid; and the control must be changed to direct vector control.

Figure 12:
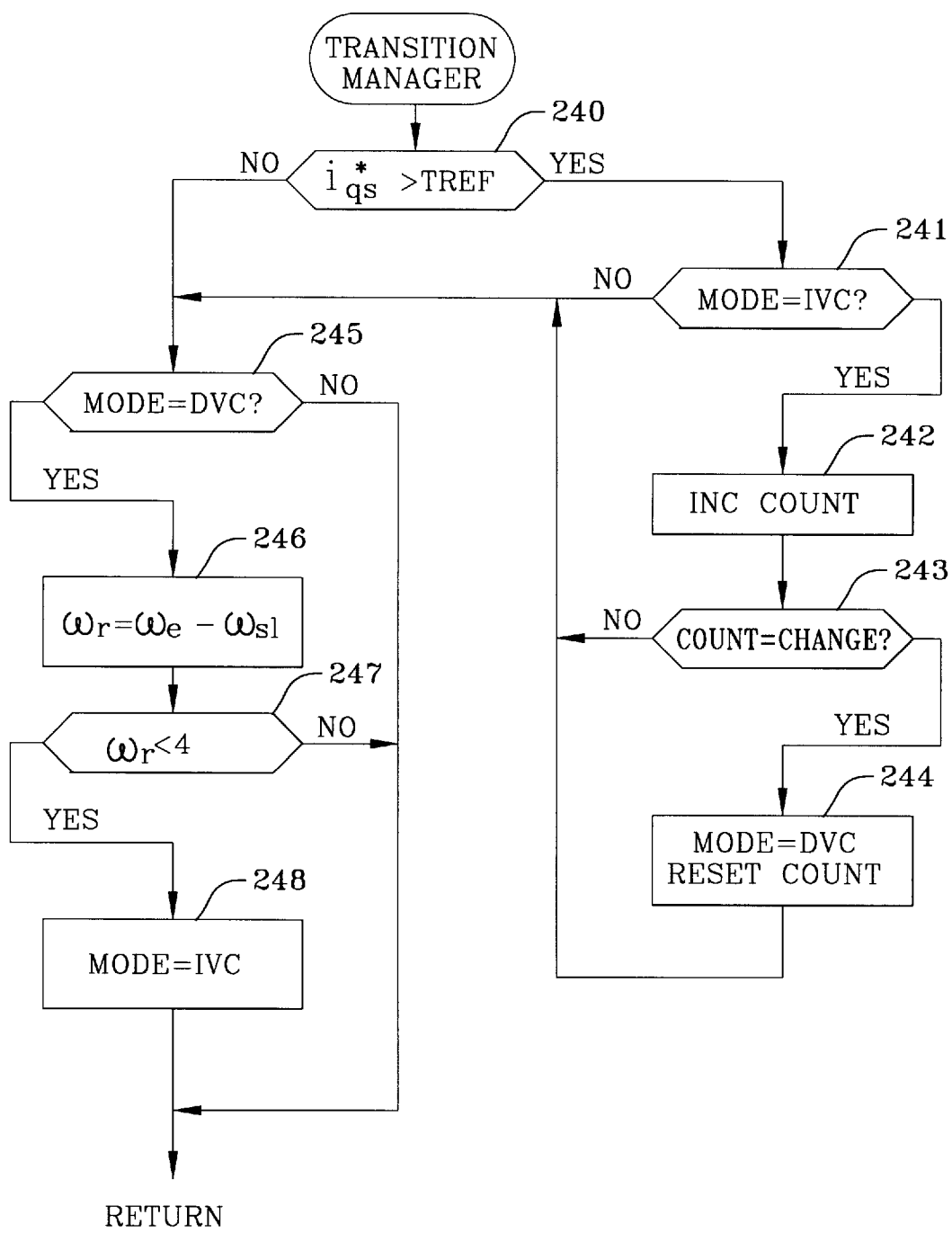

Thus, the transition manager starts motor 12 in IVC and transitions to DVC a predetermined short time after a predetermined torque $i^*_{qs}$ is commanded. In this embodiment it also transitions back to IVC if rotor speed $\omega_r$ approaches zero. Its operation is shown in more detail in the flow chart of FIG. 12. At step 240 the commanded torque $i^*_{qs}$ is compared with a reference TREF. If it exceeds the reference, the mode is checked at step 241. If the mode is IVC, COUNT is incremented at step 242. If COUNT=a reference CHANGE at step 243, the mode is set to DVC and COUNT is reset at step 244. Next, or if any of the tests at steps 240, 241 or 243 produced the alternative result, the mode is checked at step 245. If it is DVC, rotor speed is calculated at step 246 from the equation $\omega_r = \omega_e - \omega_{s1}$ and compared at step 247 with a predetermined low speed, such as 4 rad/s. If it is smaller, the mode is set to IVC at step 248. At this point, or if either of the tests at steps 245 or 247 produced the alternative result, the subroutine is finished and returns to the main program.

Returning to FIG. 9, steps 358–361 of MAIN comprise a task manager at the end of the first task which controls when the second task will be restarted. At step 358, a counter LOOP, which is initialized at zero, is incremented. Steps 359 and 360 reset LOOP to zero when it reaches 8. Step 361 causes MAIN to continue to the second task only if LOOP= 1. With all other values of LOOP (0 and 2–7), from either of steps 360 or 361, the program causes DSP 24 to branch to the location from which it was last interrupted by a data request interrupt, thus skipping a restart of the second task and allowing the current loop of the second task, which was interrupted for data output and the first task, to continue to completion.

The first step of the second task of MAIN, inverse vector rotation, is shown at step 362. It applies the non-phase compensated unit vectors for IVC or DVC operation, whichever is appropriate, to convert currents $i_{ds}^s$ and $i_{qs}^s$ in the stationary reference frame to currents in the synchronous reference frame. First, if the commanded stator flux $\Psi^*_s$ equals zero, each of currents $i_{ds}$ and $i_{qs}$ is also set to zero. Otherwise, if IVC operation is active, the currents are calculated from the following equations:

$$i_{ds} = i_{qs}^s \cos\theta_{s1} - i_{ds}^s \sin\theta_{s1}$$

$$i_{qs} = i_{qs}^s \sin\theta_{s1} - i_{ds}^s \cos\theta_{s1}$$

If DVC operation is active, however, the currents are calculated from the following equations:

$$i_{ds} = i_{qs}^s \cos\theta_{en} - i_{ds}^s \sin\theta_{en}$$

$$i_{qs} = i_{qs}^s \sin\theta_{en} - i_{ds}^s \cos\theta_{en}$$

Next, the stator decoupler $i_{dq}$ calculation is performed at step 363 according to the following equation:

$$i_{dq} = \frac{\sigma_1 (i_{qs})^2}{\Psi_s - \sigma_1 i_{ds}}$$

wherein $\sigma_1$ is a constant derived from certain parameters of motor 12. The resulting stator flux decoupler $i_{dq}$ is preferably limited, e.g. to ±5.

Flux control is performed at step 364, which corresponds to elements 50–54 of FIG. 2. The estimated phase compensated stator flux $\Psi_s$ from step 352 is subtracted from the commanded stator flux $\Psi^*_s$; and the difference is processed in a PI equation similar to that of step 356. The PI equation output is added to the stator decoupler $i_{dq}$ to produce a decoupled current $i_{dec}$.

Next, current error and limit calculations, corresponding to elements 42–44 and 57–58 of FIG. 2, are performed at step 365. First, a dynamic $i_{qs}$ limit is calculated based on the value of $i_{dec}$:

$$IQSLIMIT = \sqrt{(I_{smax})^2 - (i_{dec})^2}$$

wherein $I_{smax}$ is a constant based on the maximum stator current of motor 12. The commanded stator current i*qs is then limited to ±IQSLIMIT, and from the limited value is subtracted the estimated stator current $i_{qs}$ as calculated by the inverse vector rotator in step 361. The result is the error current signal $i_{qse}$. In addition, the estimated stator current $i_{ds}$ is subtracted from the decoupled current $i_{dec}$, which was limited in step 362, to produce the error current signal $i_{dse}$. Error current signals $i_{qse}$ and $i_{dse}$ are stored for use in the PI calculations of step 356 in the first task of MAIN.

The slip frequency calculations, corresponding to slip frequency calculator 56 of FIG. 2, are performed at step 366 of FIG. 9, according to the equation:

$$\omega_{s1} = \frac{i_{qs1} L_s}{T_r \Psi^*_s - K_2 i_{ds1}}$$

wherein $L_s$, $T_r$ and $K_2$ are the stator inductance, the rotor time constant and a machine parameter constant, respectively, of motor 12 and $i_{ds1} = i_{dec}$.

The stator resistance $R_s$ is calculated at step 367 according to the following equation:

$$R_s = -K_{r1} T_s + K_{r2}$$

where $T_s$ is the output of TEMP circuit 18 and $K_{r1}$ and $K_{r2}$ are constants which, for at least one embodiment, were found to be 0.0655 and 0.888, respectively. Use of the linear equation was found to provide a maximum error of less than 2%.

Finally, the last step of the second task is a holding loop 368.

As described above, the motor apparatus of the invention can be started from zero speed with no speed sensor using indirect vector control with a change to direct vector control after it is started. In addition, regardless of how it is initially started, it may be slowed to zero speed in direct vector control by applying an external opposing load torque which is greater than a non-zero input commanded torque. The torque current produced by the input commanded torque provides stator flux which enables the motor to remain in direct vector control at zero rotor speed as long as the opposing load torque is applied and after it is released. This feature is beneficial in an electric vehicle traction motor application, in which the accelerator pedal may be programmed to provide a small, non-zero commanded torque signal when the operator's foot is removed therefrom. In such a case the vehicle exhibits a small forward torque which is similar to that exhibited by a vehicle with a standard internal combustion engine and an automatic transmission. The small forward torque may be balanced by an opposing braking torque from the vehicle brakes to stop the vehicle and keep it stopped; and it may be used to oppose a torque due to the force of gravity on the vehicle on an uphill grade, whereby it reduces the tendency of the vehicle to roll backward down the grade when the vehicle brakes are released.

We claim:

1. Motor apparatus comprising a three phase AC motor having a stator with stator windings and a rotor, a source of electric power and a control for applying power from the source of electric power to the stator windings, the control comprising, in combination:

means for generating orthogonal, two phase stator current and voltage component signals in the stationary reference frame from sensed motor parameters, the means comprising a signal harmonic reducing low pass filter that introduces a harmonic reducing filter phase lag;

inverse vector rotation means for transforming the orthogonal, two phase stator current component signals in the stationary reference frame into orthogonal, two phase stator current component signals in the synchronous reference frame;

means for generating orthogonal, two phase commanded stator voltage component signals in the synchronous reference frame from the orthogonal, two phase stator current component signals in the synchronous reference frame and input commanded torque and flux signals;

vector rotation means for transforming the orthogonal, two phase commanded stator voltage component signals in the synchronous reference frame into orthogonal, two phase commanded stator voltage component signals in the stationary reference frame;

means for generating stator voltages in the motor in response to the orthogonal, two phase commanded stator voltage component signals in the stationary reference frame; and means for deriving a set of phase compensated unit vectors from the orthogonal, two phase, stator current and voltage component signals in the stationary reference frame and providing the set of phase compensated unit vectors to the vector rotation means, the set of phase compensated unit vectors being compensated for the harmonic reducing phase lag.

2. The motor apparatus of claim 1 further comprising means for deriving a set of non-phase compensated unit vectors from the orthogonal, two phase, stator current and voltage component signals in the stationary reference frame and providing the set of non-phase compensated unit vectors to the inverse vector rotation means.

3. The motor apparatus of claim 1 in which the means for deriving a set of phase compensated unit vectors comprises means for deriving a set of phase compensated estimated stator flux signals from the orthogonal, two phase stator current and voltage component signals in the stationary reference frame and which derives the set of phase compensated unit vectors from the set of phase compensated estimated stator flux signals.

4. The motor apparatus of claim 3 in which the means for deriving a set of phase compensated estimated stator flux signals comprises an integrating low pass filter having means for compensating the harmonic reducing filter phase lag to produce a total signal phase lag of 90 degrees in the phase compensated estimated stator flux signals.

5. The motor apparatus of claim 4 in which the integrating low pass filter comprises a plurality of cascaded low pass filters each having a phase lag of less than 90 degrees, at least one of the plurality of cascaded low pass filters having a phase lag variable in response to an estimated stator frequency so that the sum of the phase lags of the plurality of cascaded low pass filters plus the harmonic reducing phase lag is 90 degrees.

6. The motor apparatus of claim 5 in which the plurality of low pass filters comprises a first low pass filter having a fixed phase lag of 45 degrees and a second low pass filter having a variable phase lag of 45 degrees less the harmonic reducing filter phase lag.

7. The method of operating a three phase AC motor, having a stator with stator windings and a rotor, from a source of electric power, comprising the steps:

generating orthogonal, two phase stator current and voltage component signals in the stationary reference frame from sensed motor parameters, the means comprising a signal harmonic reducing low pass filter that introduces a harmonic reducing filter phase lag;

transforming the orthogonal, two phase stator current component signals in the stationary reference frame into orthogonal, two phase stator current component signals in the synchronous reference frame;

generating orthogonal, two phase commanded stator voltage component signals in the synchronous reference frame from the orthogonal, two phase stator current component signals in the synchronous reference frame and input commanded torque and flux signals;

transforming the orthogonal, two phase commanded stator voltage component signals in the synchronous reference frame into orthogonal, two phase commanded stator voltage component signals in the stationary reference frame;

generating stator voltages in the motor in response to the orthogonal, two phase commanded stator voltage component signals in the stationary reference frame;

deriving a set of phase compensated unit vectors from the orthogonal, two phase, stator current and voltage component signals in the stationary reference frame, the set of phase compensated unit vectors being compensated for the harmonic reducing phase lag; and providing the set of phase compensated unit vectors to the vector rotation means.

8. The method of claim 7 in which the step of deriving a set of phase compensated unit vectors comprises generating a set of phase compensated estimated stator flux signals, the generating of the set of phase compensated estimated stator flux signals comprising low pass filtering with a time constant providing a total phase lag, including the harmonic reducing phase lag, of 90 degrees.

9. The method of claim 7 in which the step of deriving a set of phase compensated unit vectors comprises generating a set of phase compensated estimated stator flux signals, the generating of the set of phase compensated estimated stator flux signals comprising a plurality of low pass filtering steps, each providing a phase lag less than 90 degrees, one of the low pass filtering steps providing a phase lag variable in response to stator frequency to produce a total phase lag, including the harmonic reducing phase lag, of 90 degrees.

10. The method of claim 7 further comprising the steps:

(a) providing a non-zero value of the input commanded torque signal and an opposing external braking torque on the motor rotor greater than that produced by the non-zero value of the input torque to reduce rotor speed to zero; and (b) removing the external braking torque from the motor rotor and allowing the rotor speed to accelerate from zero.

11. Motor apparatus comprising a three phase AC motor having a stator with stator windings and a rotor, a source of electric power and a control, with no rotor speed sensor, for applying power from the source of electric power to the stator windings, the control comprising, in combination:

means for generating orthogonal, two phase stator current and voltage component signals in the stationary reference frame from sensed motor parameters;

means for deriving a first set of unit vectors from predetermined starting values of input commanded torque and flux signals, means for deriving a second set of unit vectors and a third set of unit vectors from the orthogonal, two phase, stator current and voltage component signals in the stationary reference frame;

inverse vector rotation means responsive to a selected one of the first and second sets of unit vectors for transforming the orthogonal, two phase stator current component signals in the stationary reference frame into orthogonal, two phase stator current component signals in the synchronous reference frame;

means for deriving orthogonal, two phase, commanded stator voltage component signals in the synchronous reference frame from the orthogonal, two phase stator current signals in the synchronous reference frame and the input commanded torque and flux signals;

vector rotation means responsive to one of the first and third sets of unit vectors for transforming the orthogonal, two phase, commanded stator voltage component signals in the synchronous reference frame into orthogonal, two phase, commanded stator voltage component signals in the stationary reference frame;

means for deriving the motor control signals from the orthogonal, two phase, commanded stator voltage component signals in the stationary reference frame;

means for generating stator voltages in the motor in response to the motor control signals; and selection means for starting the motor in an indirect vector control mode with no rotor speed sensor using the first set of unit vectors with the inverse vector rotation means and vector rotation means and changing, after the motor is started, to a direct vector control mode alternatively using the second set of unit vectors with the inverse vector rotation means and the third set of unit vectors in the vector rotation means.

12. The motor apparatus of claim 11 in which the selection means derives a desired slip frequency at zero rotor speed from the predetermined starting values of the input commanded torque and flux signals and derives the first set unit vectors from the desired slip frequency at zero rotor speed.

13. The motor apparatus of claim 11 in which:
(1) the means for generating orthogonal, two phase stator current and voltage component signals in the stationary reference frame from sensed motor parameters comprises a signal harmonic reducing low pass filter that introduces a harmonic reducing filter phase lag;
(2) the means for deriving estimated stator flux signals derives a set of phase compensated estimated stator flux signals and a set of non-phase compensated estimated stator flux signals;

(3) the second set of unit vectors is derived from the set of non-phase compensated estimated stator flux signals; and
(4) the third set of unit vectors is derived from the set of phase compensated estimated stator flux signals.

14. The motor apparatus of claim 13 in which the means for deriving estimated stator flux signals comprises an integrating low pass filter having means for compensating the harmonic reducing filter phase lag to produce a total signal phase lag of 90 degrees in the phase compensated estimated stator flux signals.

15. The motor apparatus of claim 14 in which the integrating low pass filter comprises a plurality of cascaded low pass filters each having a phase lag of less than 90 degrees, at least one of the plurality of cascaded low pass filters having a phase lag variable in response to an estimated stator frequency so that the sum of the phase lags of the plurality of cascaded low pass filters plus the harmonic reducing phase lag is 90 degrees.

16. The motor apparatus of claim 15 in which the plurality of low pass filters comprises a first low pass filter having a fixed phase lag of 45 degrees and a second low pass filter having a phase lag of 45 degrees less the harmonic reducing filter phase lag.

17. The method of operating a three phase AC motor, having a stator with stator windings and a rotor, from a source of electric power, with no rotor speed sensor, comprising the steps:

generating orthogonal, two phase stator current and voltage component signals in the stationary reference frame from sensed motor parameters;

deriving a first set of unit vectors from predetermined starting values of input commanded torque and flux signals, deriving a second set of unit vectors and a third set of unit vectors from the orthogonal, two phase, stator current and voltage component signals in the stationary reference frame;

transforming the orthogonal, two phase stator current component signals in the stationary reference frame into orthogonal, two phase stator current component signals in the synchronous reference frame in an inverse vector rotator using one of the first and second sets of unit vectors;

deriving orthogonal, two phase, commanded stator voltage component signals in the synchronous reference frame from the orthogonal, two phase stator current signals in the synchronous reference frame and the input commanded torque and flux signals;

transforming the orthogonal, two phase, commanded stator voltage component signals in the synchronous reference frame into orthogonal, two phase, commanded stator voltage component signals in the stationary reference frame using one of the first and third sets of unit vectors;

deriving the motor control signals from the orthogonal, two phase, commanded stator voltage component signals in the stationary reference frame;

generating stator voltages in the motor in response to the motor control signals;

starting the motor in an indirect vector control mode with no rotor speed sensor using the first set of unit vectors in the inverse vector rotator and the vector rotator; and changing, after the motor is started, to a direct vector control mode alternatively using the second set of unit vectors in the inverse vector rotator and the third set of unit vectors in the vector rotator.

18. The method of claim 17 in which the step of generating orthogonal, two phase stator current and voltage component signals in the stationary reference frame comprises low pass filtering to remove signal harmonics, thereby introducing a harmonic reducing phase lag; and the step of deriving a third set of unit vectors comprises generating a set of phase compensated estimated stator flux signals, the generating of the set of estimated stator flux signals comprising low pass filtering with a time constant providing a total phase lag, including the harmonic reducing phase lag, of 90 degrees.

19. The method of claim 18 further comprising the steps:

(a) while maintaining the direct vector control mode, providing a non-zero value of the input commanded torque signal and an opposing external braking torque on the motor rotor greater than that produced by the non-zero value of the input torque to reduce rotor speed to zero; and (b) while still maintaining the direct vector control mode, removing the external braking torque from the motor rotor and allowing the rotor speed to accelerate from zero.

\* \* \* \* \*